(12) United States Patent
Zetterlund et al.

(10) Patent No.: US 10,314,101 B2
(45) Date of Patent: Jun. 4, 2019

(54) CONTROLLING WIRELESS LOCAL AREA NETWORK ACCESS

(71) Applicant: Telefonaktiebolaget LM Ericsson (publ), Stockholm (SE)

(72) Inventors: Jerker Zetterlund, Bromma (SE); Nicolas Eason, Ottawa (CA); Daniel Nilsson, Älvängen (SE); Håkan Österlund, Ekerö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/519,525

(22) PCT Filed: Dec. 17, 2014

(86) PCT No.: PCT/EP2014/078199
§ 371 (c)(1),
(2) Date: Apr. 14, 2017

(87) PCT Pub. No.: WO2016/095981
PCT Pub. Date: Jun. 23, 2016

(65) Prior Publication Data
US 2017/0280496 A1    Sep. 28, 2017

(51) Int. Cl.
*H04W 76/22* (2018.01)
*H04W 36/00* (2009.01)
*H04W 36/04* (2009.01)
*H04W 84/12* (2009.01)
(Continued)

(52) U.S. Cl.
CPC ....... *H04W 76/22* (2018.02); *H04W 36/0033* (2013.01); *H04W 64/003* (2013.01);
(Continued)

(58) Field of Classification Search
CPC ............. H04W 76/22; H04W 36/0033; H04W 64/003; H04W 76/041; H04W 84/12; H04W 88/16; H04W 92/14
See application file for complete search history.

(56) References Cited

U.S. PATENT DOCUMENTS 9,319,993 B1 *   4/2016   Urbanus .................. H04B 7/00

FOREIGN PATENT DOCUMENTS

| EP | 2854448 A1 | 4/2015 |
| WO | 2014000520 A1 | 1/2014 |
| WO | 2014191053 A1 | 12/2014 |

OTHER PUBLICATIONS

3GPP TS 23.402, "3rd Generation Partnership Project; Technical Specification Group Services and System Aspects; Architecture enhancements for non-3GPP accesses (Release 12)," Mar. 2014, 288 pages, V12.4.0, 3GPP Organizational Partners.
(Continued)

*Primary Examiner* — Ronald B Abelson
(74) *Attorney, Agent, or Firm* — NDWE LLP (57) ABSTRACT

Apparatus configured to operate as a WAC of a WAN. The apparatus comprises a database unit, a transceiver, and a resource request processor. The database unit maintains a database of a plurality of user equipment (UEs) connected to the WAN, resource usage by each of the UEs, and available resources of the WAN. The transceiver communicates with a gateway between the WAN and a telecommunications network. The resource request processor receives a resource request from the gateway, the resource request identifying a UE and indicating a required change in resource usage; and determines whether the required change in resource usage is possible based on the available resources of the WAN. If the required change in resource usage is possible, the resource request processor updates database records for resource usage by the UE and available resources of the WAN and sends a resource response to the gateway.

18 Claims, 9 Drawing Sheets

(51) Int. Cl.
  *H04W 88/16* (2009.01)
  *H04W 92/14* (2009.01)
  *H04W 64/00* (2009.01)
(52) U.S. Cl.
  CPC ........... *H04W 84/12* (2013.01); *H04W 88/16* (2013.01); *H04W 92/14* (2013.01); *H04W 64/00* (2013.01)

(56) References Cited

OTHER PUBLICATIONS

International Search Report and Written Opinion for International Application No. PCT/EP2014/078199, dated Nov. 17, 2015, 30 pages.
3GPP TS 23.402, "3rd Generation Partnership Project; Technical Specification Group Services and System Aspects; Architecture enhancements for non-3GPP accesses (Release 13)," Dec. 2014, 290 pages, V13.0.0, 3GPP Organizational Partners.
"User location information for trusted WLAN," Sep. 23-27, 2013, 4 pages, SA WG2 Temporary Document, SA WG2 Meeting S2#99, S2-133244, NETLOC_TWAN, Rel-12, Ericsson.
"Location information provided over GTP-S2a," Jan. 28-Feb. 1, 2013, 2 pages, SA WG2 Temporary Document, SA WG2 Meeting #95, S2-130355, P4C-TI, Rel-12, Ericsson.
"Access Network information reporting in case of a TWAN Access," Jan. 20-24, 2014, 2 pages, SA WG2 Meeting #101, S2-140460, Netloc_TWAN, Rel-12, Orange.
International Preliminary Report on Patentability for Application No. PCT/EP2014/078199, dated Jun. 29, 2017, 21 pages.

\* cited by examiner

CONTROLLING WIRELESS LOCAL AREA NETWORK ACCESS

CROSS-REFERENCE TO RELATED APPLICATIONS

This application is a National stage of International Application No. PCT/EP2014/078199, filed Dec. 17, 2014, which is hereby incorporated by reference.

TECHNICAL FIELD

The present invention relates to the field of telecommunications, and more specifically to a method for improving the transfer of control information between a wireless access network and a telecommunications network and apparatus for performing the method.

BACKGROUND

Telecommunications networks are required to provide the location of the participants in a call for charging and data retention purposes. For example, the network provider may have location-based charging schemes, or provide location specific services. This information is called Network Provided Location Information (NPLI). When the caller is connected directly to the telecommunications network (i.e. via a basestation/eNodeB of the network), the NPLI is provided by the basestation. Similarly, when the caller is roaming, the NPLI is provided by the roaming network.

When determining location information for a UE connected to a Wireless Local Area Network (WAN), e.g. via Wi-Fi™, which connects to the telecommunications network via an IP link, the NPLI is provided by WAN. This process is currently under standardisation. However, the standards are concerned with the communication within the telecommunications network, and between the telecommunications network and the WAN, and do not consider the handling of NPLI within the wireless access itself.

A further issue affecting WAN access is that it is not currently possible to reserve resources on the WAN, or for the telecommunications network to determine available bandwidth on the WAN. Where the UE is connected directly to the telecommunications network, the network will monitor resource usage and available resources, and reserve resources for the UE when the UE initiates a new session. This ensures that the resource usage in the network does not rise so high that it negatively affects quality of service for all users (though some users may be unable to create sessions if their section of the network is close to capacity, this is considered a better outcome than all users having significantly reduced quality of service).

Such resource management is not possible for a UE connected to a WAN. Firstly, the telecommunications network does not necessarily know the total available resources of the WAN. Secondly, the telecommunications network has no mechanism for reserving resources within the WAN. Thirdly, the WAN may provide service to multiple independent telecommunications networks (e.g. to networks run by different operators), so each telecommunications network does not know the current resource usage in the WAN. Therefore, if a large quantity of traffic is passing through a WAN, the quality of service for all users may degrade well below acceptable levels.

Figure 1:
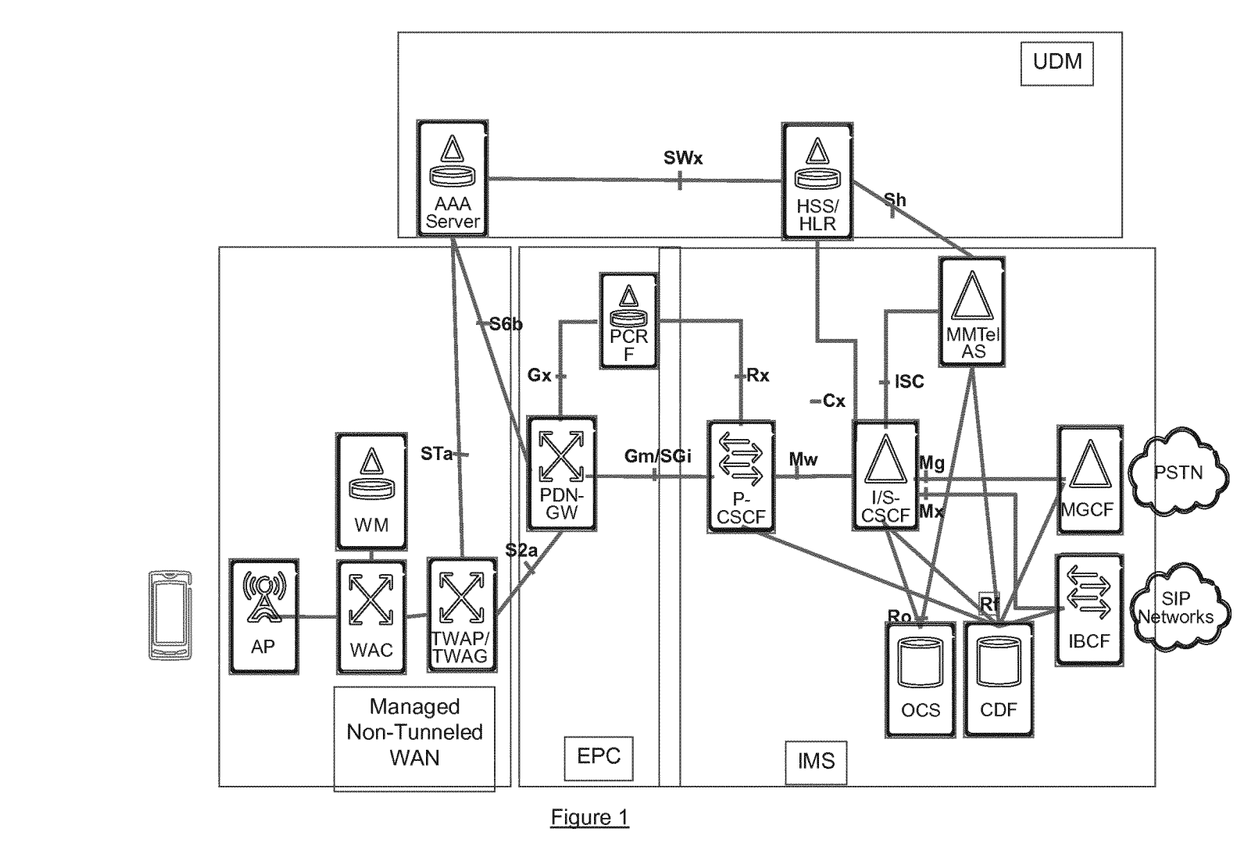
FIG. 1 is a network diagram illustrating the connection between a telecommunications network and a trusted wireless access network.

A diagram showing the connections between a telecommunications network and a trusted network is shown in FIG. 1. The PDN Gateway (PDN-GW) connects to the Trusted Wireless Access Gateway (TWAG) via the S2a interface, and the AAA server connects to the Trusted Wireless AAA Proxy (TWAP) via the STa interface (as defined in 3GPP TS 23.402 v12.4.0, "Architecture enhancements for non-3GPP accesses"). The TWAG and TWAP are generally co-located. The TWAP/TWAG handles all communication between the WAN and the telecommunications network, including signalling to the UE and signalling to other nodes of the WAN (e.g. the Wireless Access Control (WAC)).

Figure 2:
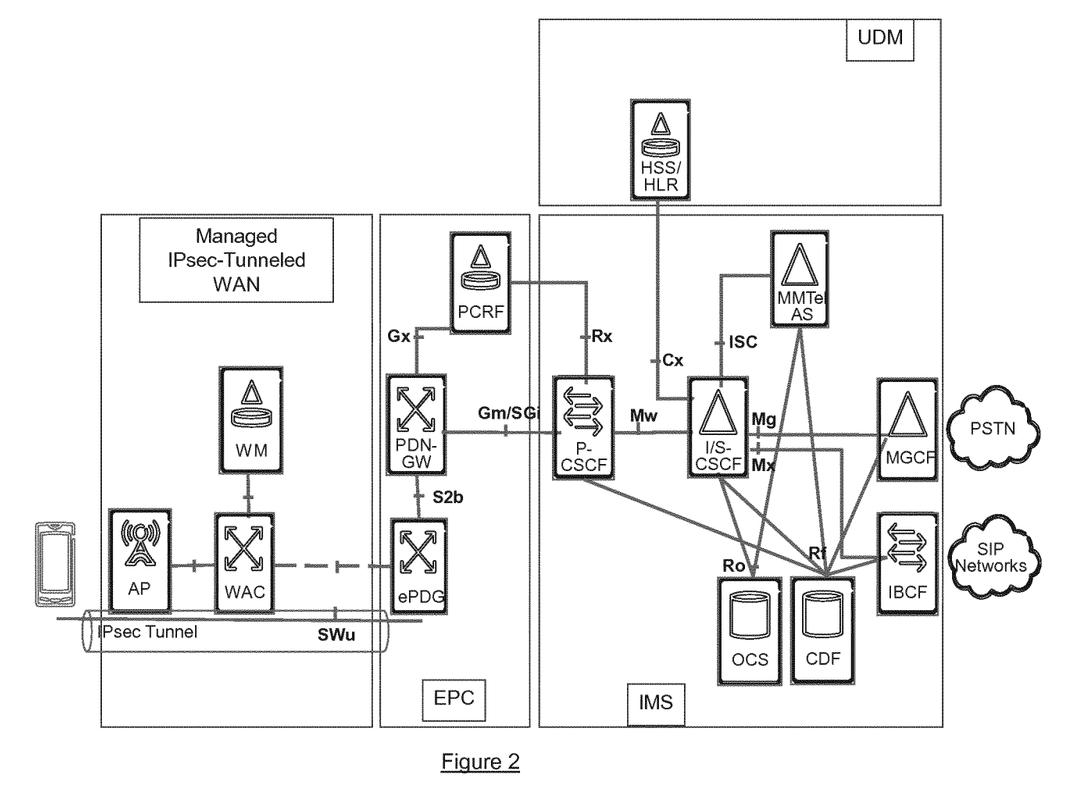
FIG. 2 is a network diagram illustrating the connection between a telecommunications network and an untrusted wireless access network.

For untrusted WANs the connection between the PLMN and the UE is as shown in FIG. 2 (excluding the dotted line). An untrusted WAN is a WAN in which at least part of the connection between the UE and the PLMN is untrusted and/or insecure. Communications between the PLMN and the UE are handled by an evolved packet data gateway (ePDG). The ePDG connects to the UE via the wireless access network. Since at least one link between the ePDG and the UE is untrusted, an IPSec tunnel is set up between the ePDG and the UE during registration of the UE with the network. Following registration, the ePDG and the UE communicate via the tunnel, over the SWu interface.

SUMMARY

According to an aspect of the invention, there is provided apparatus configured to operate as a gateway between a WAN and a telecommunications network. The apparatus comprises a first transceiver, a second transceiver, and a bearer request processor. The first transceiver is configured to communicate with a WAC of the WAN.

The second transceiver is configured to communicate with a node of the telecommunications network. The bearer request processor is configured to:
  receive via the second transceiver, from the node of the telecommunications network, a bearer request, the bearer request being a request to create, modify, or terminate a bearer associated with a user equipment, UE;
  send, via the first transceiver, a resource request to the WAC, the resource request identifying the UE and indicating a required change in resource usage in order to fulfil the bearer request;
  receive, via the first transceiver, a resource response from the WAC; and
  send, via the second transceiver, a bearer response to the node of the telecommunications network.

According to a further aspect, there is provided apparatus configured to operate as a WAC of a WAN. The apparatus comprises a database unit, a transceiver, and a resource request processor. The database unit is configured to maintain a database of user equipments, UEs, connected to the WAN, resource usage by each of the UEs, and available resources of the WAN. The transceiver is configured to communicate with a gateway between the WAN and a telecommunications network. The resource request processor is configured to:
  receive, via the transceiver, a resource request from a gateway between the WAN and a telecommunications network, the resource request identifying a UE and indicating a required change in resource usage;
  determine whether the required change in resource usage is possible based on the available resources of the WAN;
  if the required change in resource usage is not possible:
    send, via the transceiver, a resource response to the gateway indicating that the required change in resource usage is not possible;

if the required change in resource usage is possible:
cause the database unit to update database records for resource usage by the UE and available resources of the WAN in dependence upon the required change in resource usage;
send, via the transceiver, a resource response to the gateway indicating that the required change in resource usage is possible.

According to a yet further aspect, there is provided apparatus configured to operate as a gateway between a WAN and a telecommunications network. The apparatus comprises a first transceiver, a second transceiver, and a location request processor. The first transceiver is configured to communicate with a wireless access controller, WAC of the WAN. The second transceiver is configured to communicate with a node of the telecommunications network. The location request processor is configured to:
receive, via the second transceiver, from the node of the telecommunications network, a location request, the location request identifying a user equipment, UE;
send, via the first transceiver, a location request to the WAC, the location request identifying the UE;
receive, via the first transceiver, a location response from the WAC, the location response containing network provided location information, NPLI, relating to the UE;
send, via the second transceiver, a location response to the node of the telecommunications network; the location response containing the NPLI.

According to a yet further aspect, there is provided apparatus configured to operate as a WAC of a WAN. The apparatus comprises a database unit, a transceiver, and a location request processor. The database unit is configured to maintain a database of UEs connected to the WAN, and network provided location information, NPLI, for each of the UEs. The transceiver is configured to communicate with a gateway between the WAN and a telecommunications network. The location request is processor configured to:
receive, via the transceiver, a location request from the gateway, the location request identifying a UE;
retrieve NPLI for the UE from the database unit;
send, via the transceiver, a location response to the gateway, the location response containing the NPLI for the UE.

According to a yet further aspect there is provided apparatus configured to operate as a gateway between a WAN and a telecommunications network. The apparatus comprises a first transceiver, a second transceiver, and a bearer request processor. The first transceiver is configured to communicate with a wireless access controller, WAC, of the WAN. The second transceiver is configured to communicate with a node of the telecommunications network. The bearer request processor is configured to:
receive, via the second transceiver, from the node of the telecommunications network, a bearer request, the bearer request being a request to create, modify, or terminate a bearer associated with a user equipment, UE;
send, via the first transceiver, a status request to a wireless access controller, WAC, of the WAN;
receive, via the first transceiver a status response from the WAC, the status response indicating available resources of the WAN and/or current resource usage in the WAN;
determine, on the basis of the status response, whether it is possible to fulfil the request to create, modify, or terminate the bearer;
send, via the second transceiver, a bearer response to the node of the telecommunications network indicating whether or not it is possible to fulfil the request.

According to a yet further aspect, there is provided a method in a gateway between a WAN and a telecommunications network. The gateway receives, from a node of the telecommunications network, a bearer request, the bearer request containing any one of a request to create, modify, or terminate a bearer associated with a UE. The gateway then sends a resource request to a WAC of the WAN, the resource request identifying the UE and indicating a required change in resource usage in order to fulfil the bearer request. The gateway then receives a resource response from the WAC and sends a bearer response to the node of the telecommunications network.

According to a yet further aspect of the present invention, there is provided a method in a WAC of a WAN. The WAC maintains a database of UEs connected to the WAN, resource usage by each of the UEs, and available resources of the WAN. The WAC receives a resource request from a gateway between the WAN and a telecommunications network, the resource request identifying a UE and indicating a required change in resource usage. The WAC then determines whether the required change in resource usage is possible based on the available resources of the WAN. If the required change in resource usage is not possible, the WAC sends a resource response to the gateway indicating that the required change in resource usage is not possible. If the required change in resource usage is possible, the WAC updates database records for resource usage by the UE in dependence upon the required change in resource usage, and sends a resource response to the gateway indicating that the required change in resource usage is possible.

According to a yet further aspect of the present invention, there is provided a method in a gateway between a WAN and a telecommunications network. The gateway receives, from a node of the telecommunications network, a location request, the location request identifying a UE. The gateway then sends a location request to a WAC of the WAN, the location request identifying the UE. The gateway then receives a location response from the WAC, the location response containing network provided location information, NPLI, relating to the UE. The gateway then sends a location response to the node of the telecommunications network; the location response containing the NPLI.

According to a yet further aspect of the present invention, there is provided a method in a WAC of a WAN. The WAC maintains a database of UEs connected to the WAN, and network provided location information, NPLI, for each of the UEs. The WAC receives a location request from a gateway between the WAN and a telecommunications network, the location request identifying a UE. The WAC then sends a location response to the gateway, the location response containing NPLI for the UE.

According to a yet further aspect of the present invention, there is provided a method in a gateway between a WAN and a telecommunications network. The gateway receives, from a node of the telecommunications network, a bearer request, the bearer request containing any one of a request to create, modify, or terminate a bearer associated with a UE. The gateway then sends a status request to a WAC of the WAN. The gateway then receives a status response from the WAC, the status response indicating available resources of the WAN and/or current resource usage in the WAN. The gateway then determines, on the basis of the status response, whether it is possible to fulfil the request to create, modify, or terminate the bearer. The gateway then sends a bearer response to the node of the telecommunications network indicating whether or not it is possible to fulfil the request.

According to a yet further aspect of the present invention, there is provided a computer program comprising computer readable code which, when run on an apparatus, causes the apparatus to perform any one of the above methods.

Further embodiments of the invention are defined in the appended claims.

BRIEF DESCRIPTION OF THE DRAWINGS

FIG. 4 (split into 4A and 4B) is a signalling diagram showing the signalling according to a further embodiment;

LIST OF ABBREVIATIONS & DEFINITIONS

AAA Authentication, Authorization and Accounting
AP Access Point
BSSID Basic Service Set ID
DHCP Dynamic Host Configuration Protocol
ePDG Evolved Packet Data Gateway
FLT First Line Telephony
GTP GPRS Tunneling Protocol
HSS Home Subscriber Server
IEEE Institute of Electrical and Electronics Engineers
IMS IP Multimedia Subsystem
MAC Media Access Control (e.g. MAC address)
NetLoc Network Provided Location
NPLI Network Provided Location to IMS
PCC Policy and Charging Control
PCRF Policy and Charging Rules Function
PDN-GW Packet Data Network Gateway
OTT Over the Top
SSID Service Set Identifier
TWAG Trusted WAN Access Gateway
TWAN Trusted WAN Access Network
TWAP Trusted WAN MA Proxy
UE User Equipment
WAC Wireless Access Controller
WFA WiFi Alliance
WAN Wireless Access Network
WM Wireless Management system Note that "gateway" is used herein to encompass proxies which provide interconnectivity between networks. In particular, the TWAP is considered a gateway, since it connects the telecommunications network and the WAN.

DETAILED DESCRIPTION

In order to allow for resource reservation and better handling of NPLI between the WAN and the telecommunications network, new signalling is proposed herein. This signalling takes place between a gateway of the telecommunications network (e.g. the TWAP, TWAG, or ePDG) and the Wireless Access Controller (WAC) of the wireless access network.

Figure 3:
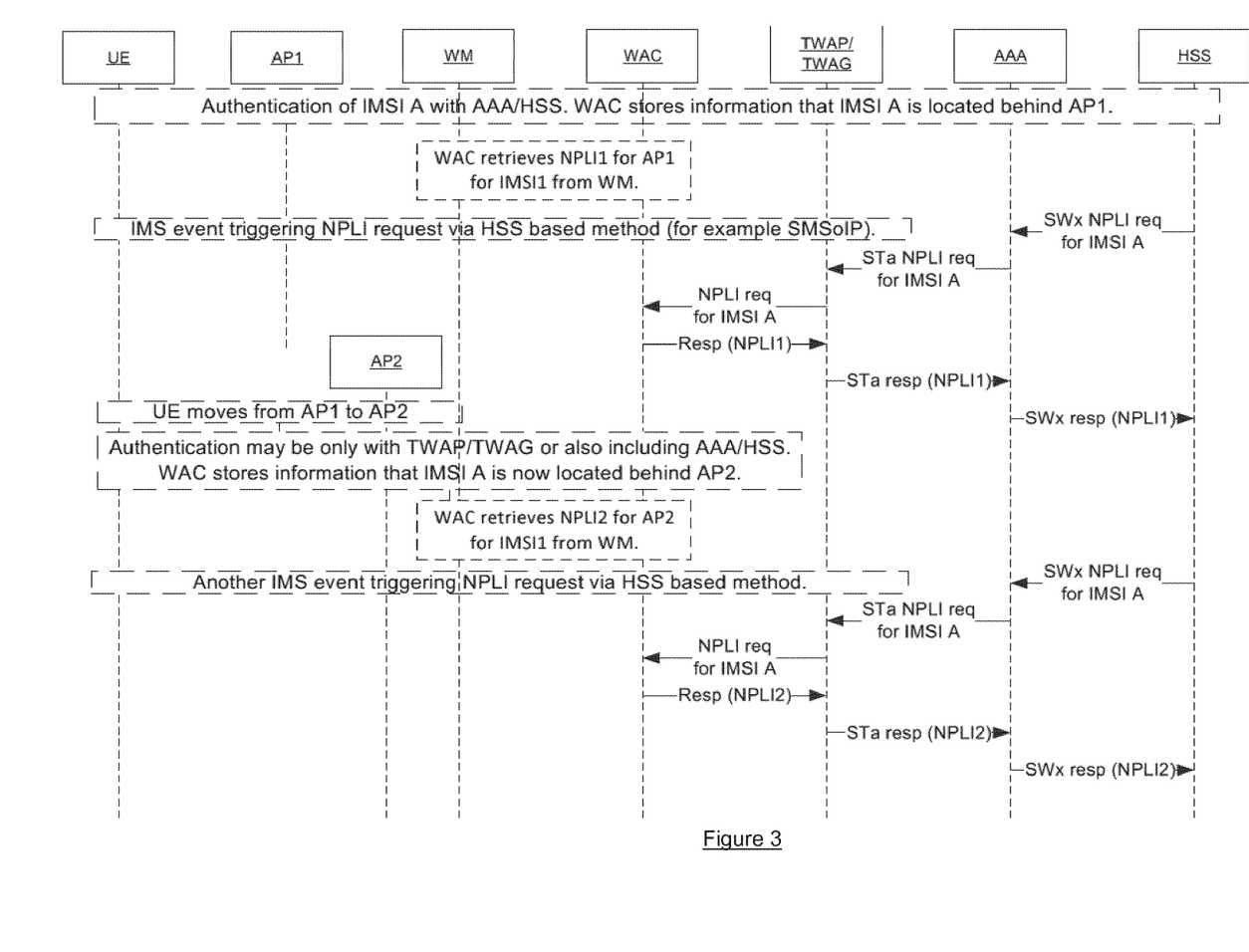
FIG. 3 is a signalling diagram showing the signalling according to an embodiment.
Figure 4A:
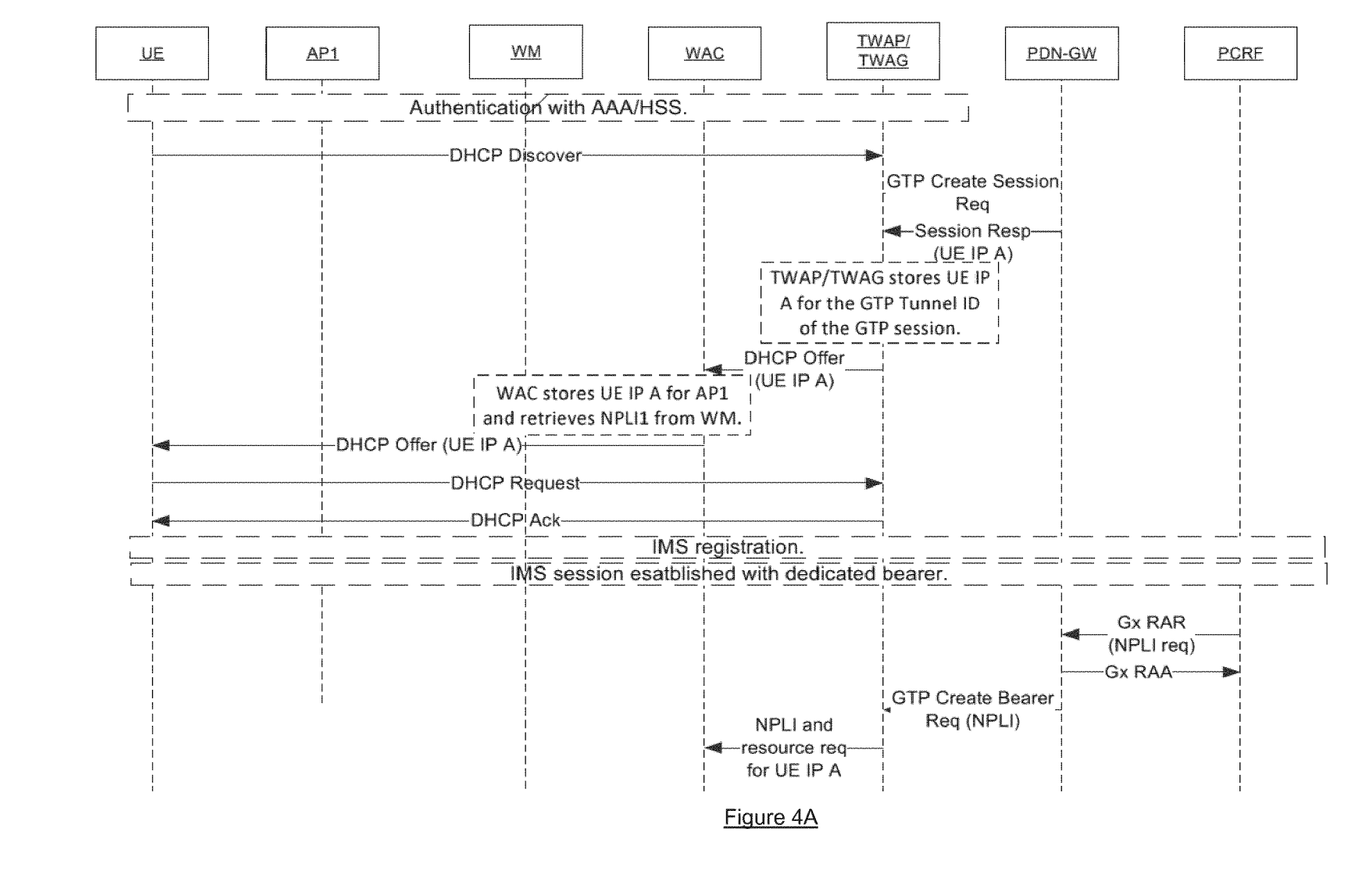
Figure 4B:
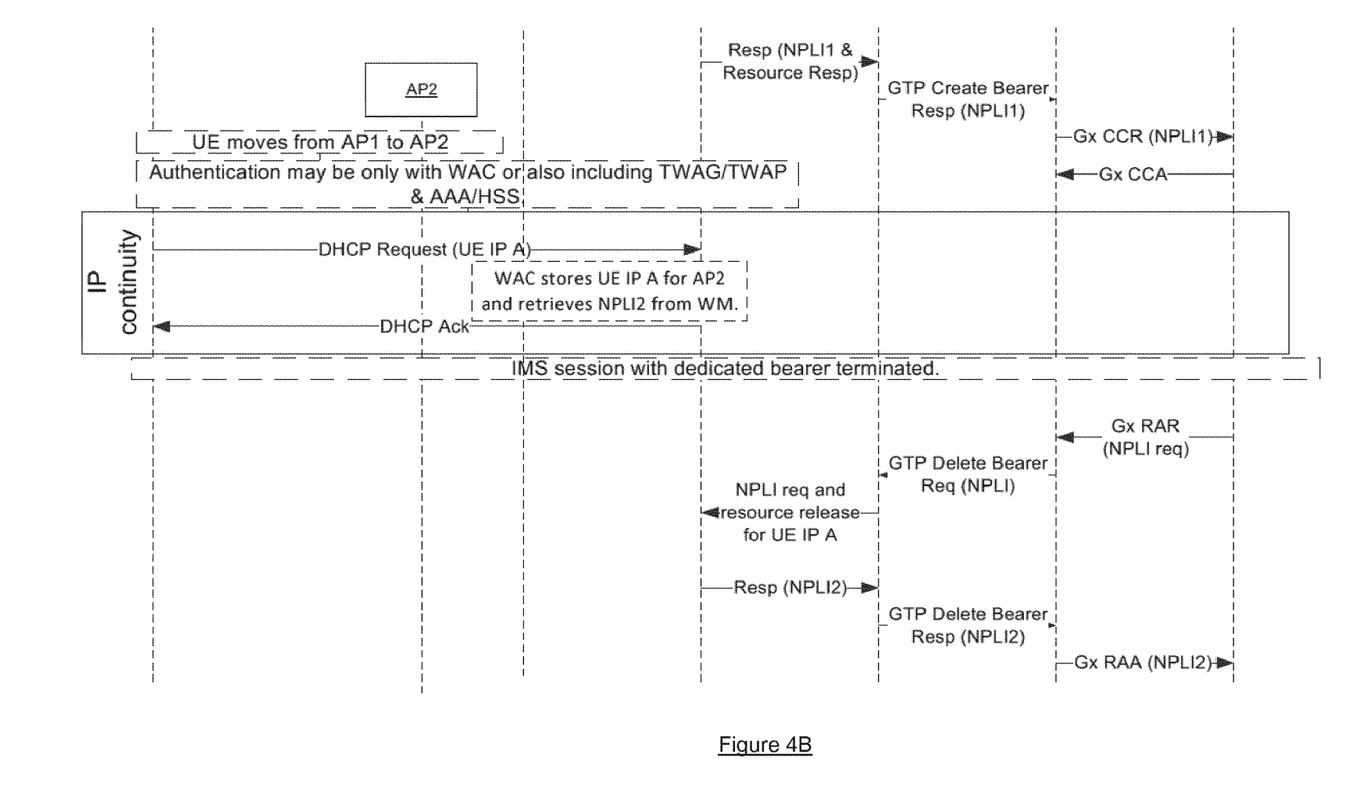

The method as applied to retrieving NPLI is shown in FIG. 3. FIG. 3 shows the signalling for this embodiment in the case where NPLI is requested by the HSS, and the gateway is a TWAP/TWAG (i.e. the WAN is trusted), but the skilled person will appreciate that the method is equivalent where the requesting entity is some other node of the telecommunications network, or where the WAN is untrusted (in which case the steps described as performed at the TWAP/TWAG are performed at the ePDG). The gateway receives a request for NPLI for the UE from a node of the telecommunications network (e.g. from the HSS via an AAA server as shown in FIG. 3). The gateway then sends an NPLI request to the WAC of the WAN which the UE is connected to. The WAC determines the NPLI, and sends the NPLI to the gateway. The gateway then sends the NPLI to the requesting node. For a UE connected to a wireless access network, the NPLI for the UE contains location information for the access point to which the UE is connected. The WAC maintains a list of which UEs are connected to which APs. The WAC may request location information for the APs from the Wireless Manager of the WAN (i.e. to translate the identifier of the AP to which the UE is connected into location information required by the telecommunications network), either periodically or in response to an NPLI request being received by the WAC. In the event that the WAC determines that the location information of the UE has changed (i.e. the UE has connected to a different AP), it will update the location information records for the UE.

In the case of a trusted WAN, an interface between the TWAP/TWAG and the WAC exists in current standards, and so the signalling described above may be sent using this interface. In the case of an untrusted WAN, there is currently no interface defined between the ePDG and the WAC, so a new interface is to be used for the signalling (shown by the dotted line in FIG. 2).

Similar signalling may be used to allow resource reservation for wireless access. The signalling for this embodiment is shown in FIG. 3 (again, this is shown for the case of a trusted WAN but can easily be adapted to the untrusted case by replacing the TWAP/TWAG with an ePDG). The gateway receives an incoming request to create, modify, or terminate a bearer (i.e. a request which would require resources to be reserved, or an update to reserved resources) for a UE which is connected to a WAN. The gateway sends a resource request to the WAC. The resource request identifies the UE and indicates a required change in resource usage in order to fulfil the requests. The resource request may directly indicate the required change in usage (i.e. this may be calculated at the gateway, or included in the original request to create/modify/terminate the bearer), or may include sufficient details of the proposed change for the WAC to determine the required change in usage (e.g. if the request is a request to terminate a bearer, it may simple specify the bearer which is no longer required, and the WAC can free up the corresponding resources). The WAC then calculates whether the request can be fulfilled, and if resource reservation is required the WAC reserves sufficient resources to accommodate the request. The WAC then sends a resource response to the gateway, the resource response indicating whether or not the resource request can be fulfilled. The gateway sends a response to the node which requested the creation/modification/termination of the bearer indicating whether or not the request can be fulfilled.

If the request can be fulfilled, bearer establishment then proceeds as described in current standards.

In order to manage resource reservations, the WAC has a database of UEs connected to the WAN, resource usage and/or reservations for the UEs, and available resources of the WAN. Recording newly reserved resources or previously reserved resources which are no longer required may comprise updating database records for resource usage by the UE. In this way resources can be reserved in the WAN, even though the WAN may be used by several different telecommunication networks (e.g. networks run by different operators).

While this method makes it possible to determine whether quality of service can be maintained for new bearers, it does involve providing information about the bearers to the WAN. This may be undesirable due to privacy considerations, especially in the case of an untrusted WAN. Therefore, in an alternative embodiment, the gateway may determine whether the resource request can be fulfilled based on the available resources of the WAN. This embodiment does not allow resources to be reserved, and therefore does not entirely guarantee good QoS for all bearers (e.g. in the case where the resource usage by another bearer fluctuates heavily), but it is still a significant improvement over simply establishing the bearer and hoping that sufficient resources are available.

As in the previous embodiment, the gateway receives a request to create, modify, or terminate a bearer associated with a UE connected to a WAN. The gateway sends a status request to the WAC of the WAN, and the WAC returns a status response indicating available resources of the WAN and/or current resource usage of the WAN (in the case where the gateway is aware of the total resources of the WAN). The gateway determines, on the basis of the status response, whether it is possible to fulfil the request to create/modify/terminate the bearer (i.e. whether the available resources are sufficient to fulfil the request). The gateway then sends a response to the node which requested creation/modification/termination of the bearer indicating whether or not it is possible to fulfil the request. If the request can be fulfilled, bearer establishment then proceeds as described in current standards.

When requesting resource information or reservation according to either of the previous two embodiments, the gateway may also request NPLI according to the first embodiment.

In a further embodiment, the gateway may subscribe to updates from the WAC for any changes in NPLI for UEs handled by the gateway. The WAC would then send new NPLI information to the gateway whenever it is notified of a change by the WM or a DHCP server of the WAN. This may be accomplished, for example, by the gateway sending a subscription request to the WAC, and the WAC providing NPLI updates to the gateway. Similarly, the gateway may subscribe for updates to the resource usage at the UE and may then calculate whether an incoming request to create/modify/terminate a bearer may be fulfilled without having to poll the WAC for each request. This has similar disadvantages to the other embodiment where the comparison between the required resources and the available resources is performed at the gateway, in that it is not possible to reserve resources within the WAN by this method.

When sending requests to the WAC in any of the above embodiments, the gateway may identify the UE, for example by the IMSI of the UE, IP address of the UE within the WAN, MAC address of the UE, or any other suitable identifier.

Figure 5:
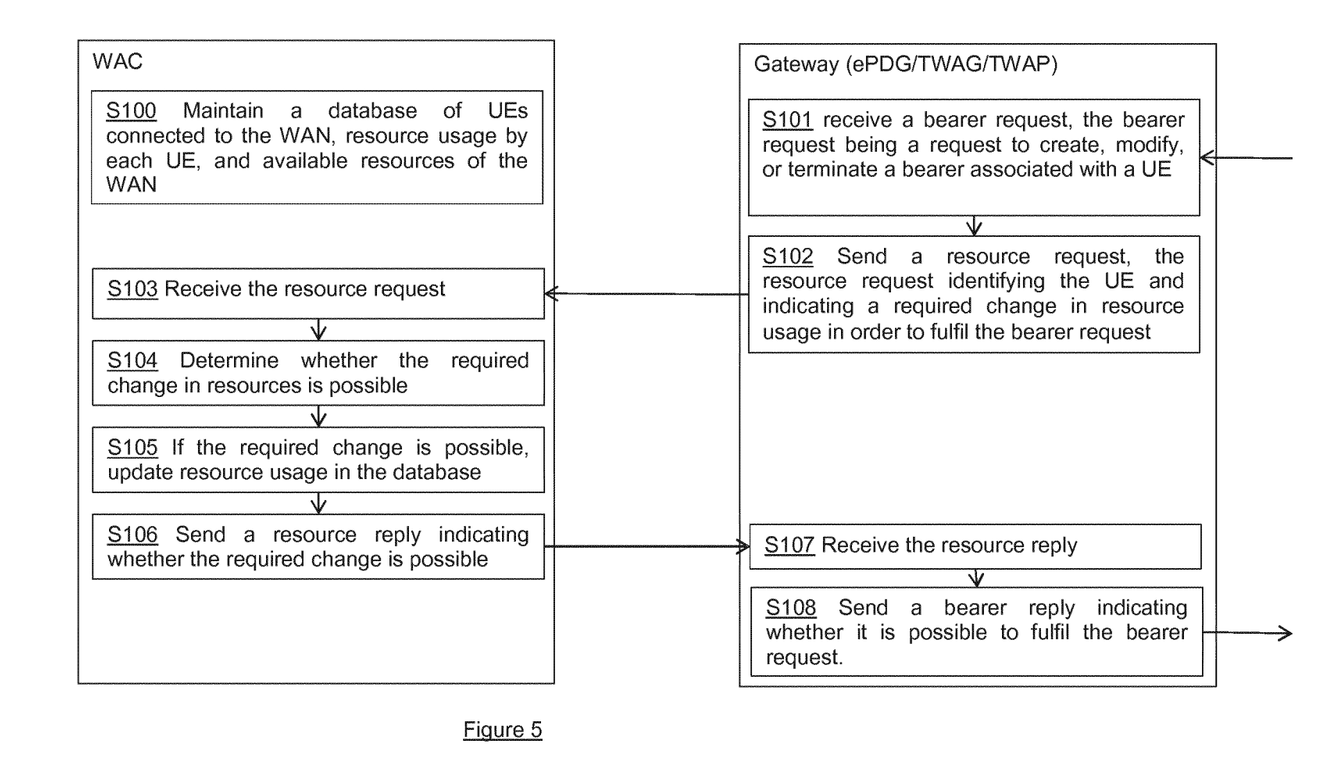
FIGS. 5, 6, and 7 are flowcharts of methods according to various embodiments.

FIG. 5 is a flowchart of a method for reserving resources in a WAN. The WAC of the WAN maintains a database of UEs connected to the WAN, resource usage by each UE, and available resources of the WAN (S100). The gateway (e.g. ePDG, TWAP, or TWAG) receives a bearer request, the bearer request being a request to create, modify, or terminate a bearer associated with a UE (S101). In response, the gateway sends a resource request to the WAC, identifying the UE and indicating a required change in resource usage in order to fulfil the bearer request (S102). The WAC receives the resource request (S103), and determines whether the required change in resources is possible (S104), e.g. based on the current available resources of the WAN and the required change in resource usage. If the required change is possible, the WAC updates resource usage for the UE in the database (S105). The WAC then sends a resource reply to the gateway indicating whether the required change is possible (S106), and the gateway, after receiving the resource reply (S107), sends a bearer reply to the node which made the bearer request indicating whether or not it is possible to fulfil the bearer request (S108).

Figure 6:
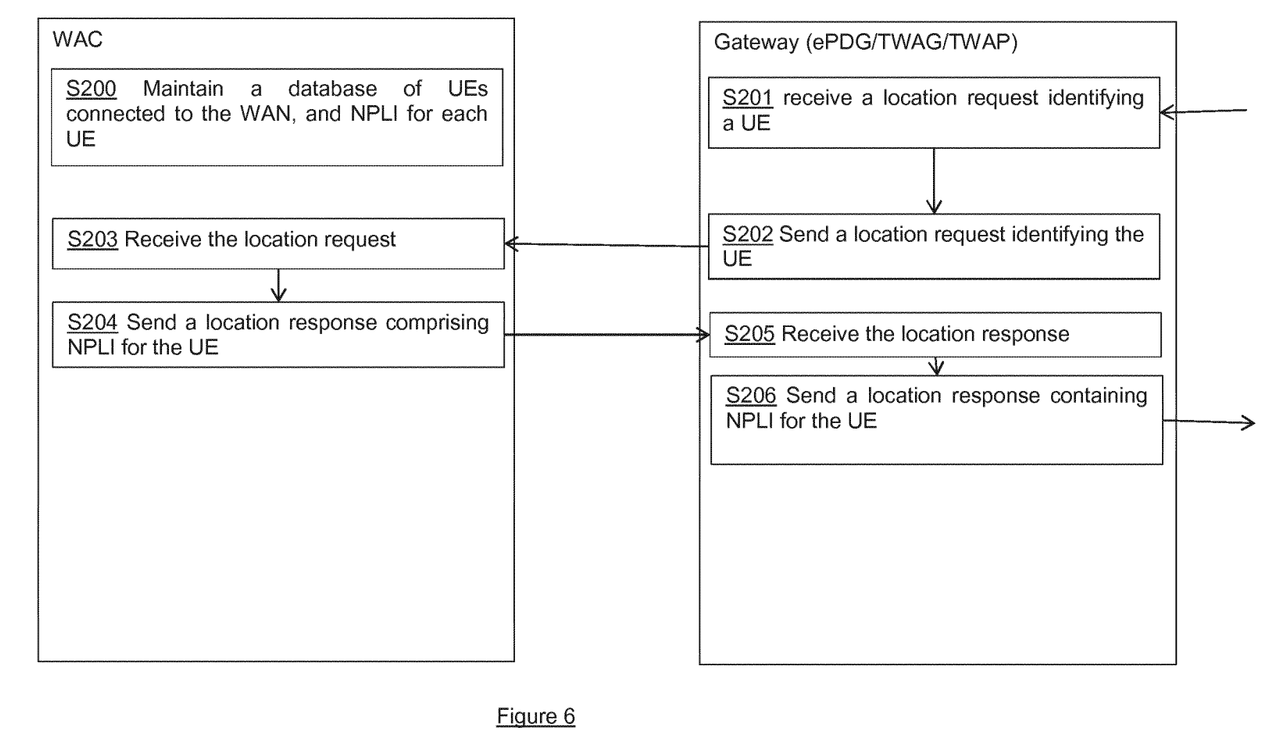

FIG. 6 is a flowchart of a method of obtaining location information for a UE connected to a WAN. The WAC maintains a database of UEs connected to the WAN, and NPLI for each UE (S200). The gateway receives a location request identifying the UE (S201), and sends a location request identifying the UE to the WAC (S202). These location requests may be identical, or they may differ according to the communication protocols between the gateway and the telecommunications network or the WAC. Similarly, the identifier for the UE may differ between the requests (though it will still identify the same UE). The WAC receives the location request (S203) and sends a location response comprising NPLI for the UE to the gateway (S204). The gateway receives the location response (S205), and sends a further location response comprising the NPLI to the node which sent the original location request (S206). The location responses and/or the NPLI may be in different formats depending on the communication protocols on each link.

Figure 7:
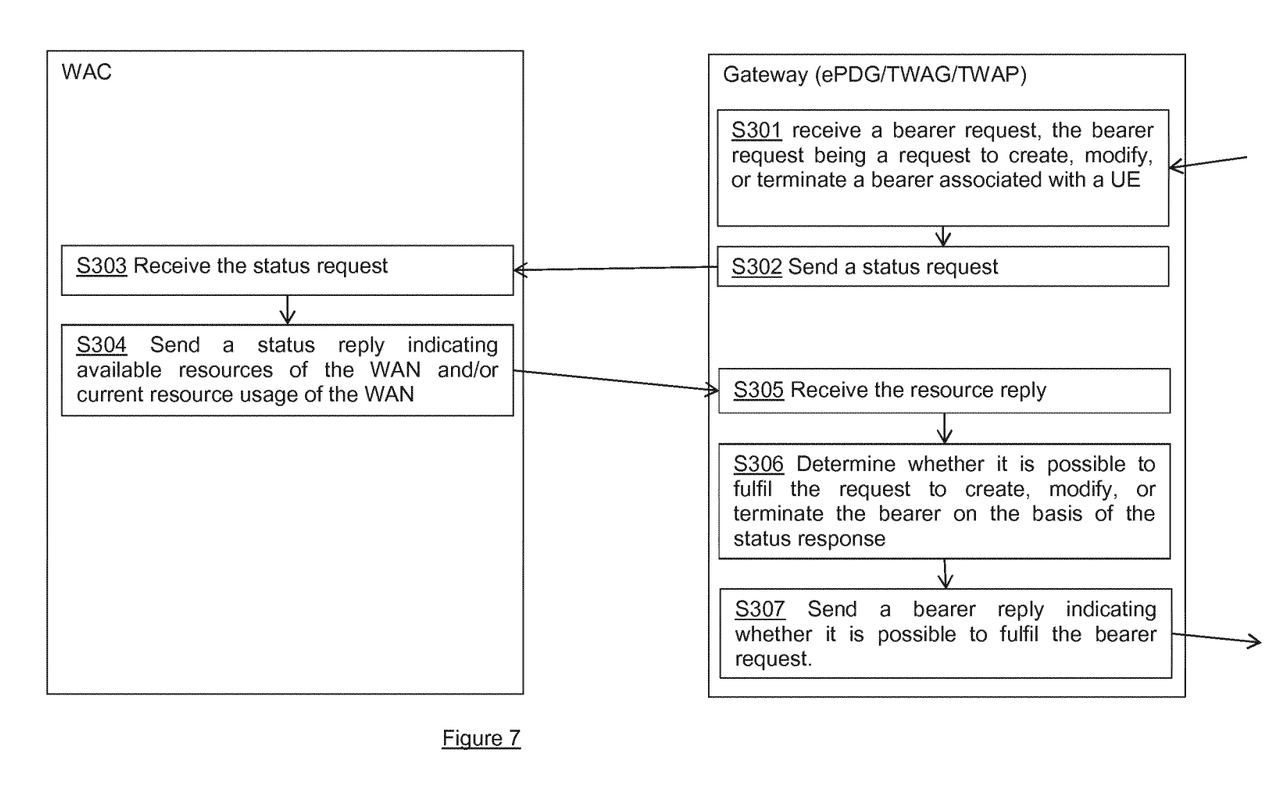

FIG. 7 is a flowchart for a method of handling bearer requests relating to a UE connected to a WAN. A gateway serving the UE receives a bearer request, the bearer request being a request to create, modify, or terminate a bearer associated with a UE (S301). The gateway then sends a status request to the WAC of the WAN to which the UE is connected (S202). The WAC receives the status request (S303), an in response sends a status reply indicating available resources of the WAN and/or current resource usage of the WAN (S304). The gateway receives the status reply (S305) and determines whether it is possible to fulfil the bearer request based on the information in the status reply and the information in the bearer request (S306). The gateway then sends a bearer reply to the node which sent the bearer request, the bearer reply indicating whether or not it is possible to fulfil the bearer request (S307).

Figure 8:
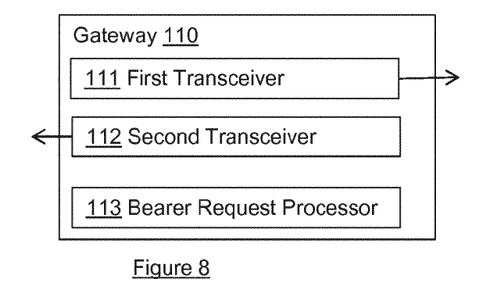
FIGS. 8, 10, and 12 are schematic diagrams showing gateways according to various embodiments.

FIG. 8 is a schematic diagram of an apparatus (110) configured to operate as a gateway between a WAN and a telecommunications network. The apparatus comprises a first transceiver (111), a second transceiver (112) and a bearer request processor (113). The first transceiver (111) is configured to communicate with the WAC of the WAN. The second transceiver (112) is configured to communicate with nodes of the telecommunications network. The bearer request processor is configured to:

receive via the second transceiver, from the node of the telecommunications network, a bearer request, the bearer request being a request to create, modify, or terminate a bearer associated with a user equipment, UE;

send, via the first transceiver, a resource request to the WAC, the resource request identifying the UE and indicating a required change in resource usage in order to fulfil the bearer request;

receive, via the first transceiver, a resource response from the WAC; and send, via the second transceiver, a bearer response to the node of the telecommunications network.

Figure 9:
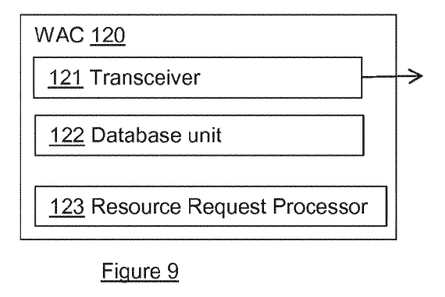
FIGS. 9 and 11 are schematic diagrams showing wireless access controllers according to various embodiments.

FIG. 9 is a schematic diagram of an apparatus (120) configured to operate as a WAC of a WAN. The apparatus comprises a transceiver (121), a database unit (122), and a resource request processor (123). The transceiver (121) is configured to communicate with a gateway between the WAN and a telecommunications network. The database unit (122) is configured to maintain a database of user equipments, UEs, connected to the WAN, resource usage by each of the UEs, and available resources of the WAN. The resource request processor (123) is configured to:

receive, via the transceiver, a resource request from a gateway between the WAN and a telecommunications network, the resource request identifying a UE and indicating a required change in resource usage;

determine whether the required change in resource usage is possible based on the available resources of the WAN;

if the required change in resource usage is not possible:
send, via the transceiver, a resource response to the gateway indicating that the required change in resource usage is not possible;

if the required change in resource usage is possible:
cause the database unit to update database records for resource usage by the UE and available resources of the WAN in dependence upon the required change in resource usage;
send, via the transceiver, a resource response to the gateway indicating that the required change in resource usage is possible.

Figure 10:
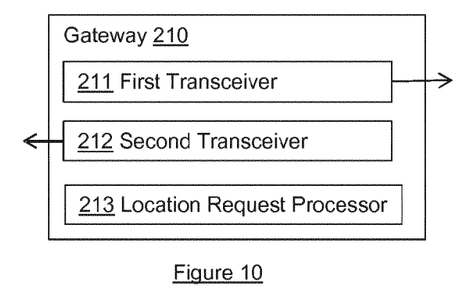

FIG. 10 is a schematic diagram of an apparatus (210) configured to operate as a gateway between a wireless access network, WAN, and a telecommunications network. The apparatus comprises a first transceiver (211), a second transceiver (212) and a location request processor (213). The first transceiver (211) is configured to communicate with a wireless access controller, WAC, of the WAN. The second transceiver (212) is configured to communicate with a node of the telecommunications network. The location request processor (213) is configured to:

receive, via the second transceiver, from the node of the telecommunications network, a location request, the location request identifying a user equipment, UE;

send, via the first transceiver, a location request to the WAC, the location request identifying the UE;

receive, via the first transceiver, a location response from the WAC, the location response containing network provided location information, NPLI, relating to the UE; and send, via the second transceiver, a location response to the node of the telecommunications network; the location response containing the NPLI.

Figure 11:
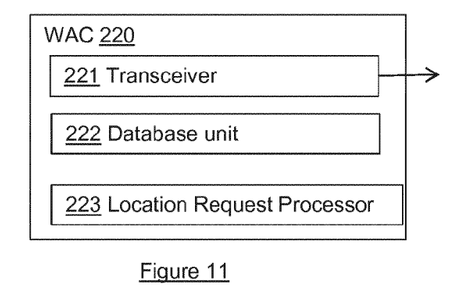

FIG. 11 is a schematic diagram of an apparatus (220) configured to operate as a WAC of a WAN. The apparatus comprises a transceiver (221), a database unit (222) and a location request processor (223). The database unit (222) is configured to maintain a database of user equipments, UEs, connected to the WAN, and network provided location information, NPLI, for each of the UEs. The transceiver (221) is configured to communicate with a gateway between the WAN and a telecommunications network. The location request processor (223) is configured to:

receive, via the transceiver, a location request from the gateway, the location request identifying a UE;

retrieve NPLI for the UE from the database unit;

send, via the transceiver, a location response to the gateway, the location response containing the NPLI for the UE.

Figure 12:
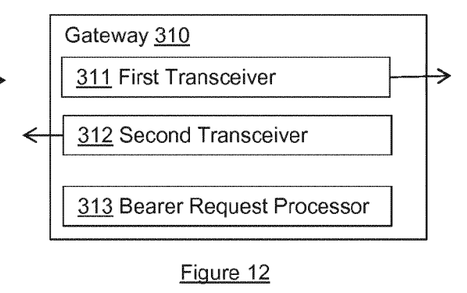

FIG. 12 is a schematic diagram of an apparatus (310) configured to operate as a gateway between a WAN and a telecommunications network. The apparatus comprises a first transceiver (311), a second transceiver (312) and a bearer request processor (313). The first transceiver (311) is configured to communicate with a WAC of the WAN. The second transceiver (312) is configured to communicate with nodes of the telecommunications network. The bearer request processor (313) is configured to:

receive, via the second transceiver, from the node of the telecommunications network, a bearer request, the bearer request being a request to create, modify, or terminate a bearer associated with a user equipment, UE;

send, via the first transceiver, a status request to a wireless access controller, WAC, of the WAN;

receive, via the first transceiver a status response from the WAC, the status response indicating available resources of the WAN and/or current resource usage in the WAN;

determine, on the basis of the status response, whether it is possible to fulfil the request to create, modify, or terminate the bearer;

send, via the second transceiver, a bearer response to the node of the telecommunications network indicating whether or not it is possible to fulfil the request.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. In particular, the embodiment relating to NPLI requests may be combined with either of the other embodiments by including an NPLI request in requests made by the gateway, and by including NPLI within responses sent by the WAC.

The invention claimed is:

1. An apparatus configured to operate as a gateway between a wireless access network (WAN) and a telecommunications network, wherein the WAN configures a plurality of user equipment (UEs) for operation in the WAN, the apparatus comprising:

a first transceiver configured to communicate with a wireless access controller (WAC) of the WAN, wherein the WAC monitors resource usage of the WAN by each user equipment (UE) of the plurality of UEs and maintains a database of resource usage by each UE;

a second transceiver configured to communicate with a node of the telecommunications network; and a bearer request processor configured to:
  receive via the second transceiver, from the node of the telecommunications network, a bearer request, the bearer request being a request to create, modify, or terminate a bearer associated with a UE of the plurality of UEs;
  send in response to the bearer request, via the first transceiver, a resource request to the WAC, the resource request identifying the UE and indicating a required change in the resource usage for the UE in order to fulfil the bearer request;
  receive, via the first transceiver, a resource response from the WAC, wherein the resource response is a reply to the resource request, and when the WAN is capable of accommodating the required change in the resource usage for the UE based on available resources of the WAN, the WAC updates the database of the resource usage with the required change and indicates accommodation of the required change in the resource response; and
  send, via the second transceiver, a bearer response to the node of the telecommunications network, wherein the bearer response is generated from the resource response to indicate whether or not it is possible to fulfil the bearer request based on the request for the required change.

2. An apparatus configured to operate as a wireless access controller (WAC) of a wireless access network (WAN), wherein a plurality of user equipment (UEs) are connected to the WAN, the apparatus comprising:
  a database unit configured to monitor resource usage of the WAN by each user equipment (UE) of the plurality of UEs and maintain a database of resource usage by each UE;
  a transceiver configured to communicate with a gateway between the WAN and a telecommunications network; and
  a resource request processor configured to:
    receive, via the transceiver, a resource request from the gateway between the WAN and the telecommunications network, the resource request identifying a UE of the plurality of UEs and indicating a required change in resource usage for the UE; and
    determine whether the WAN is capable of accommodating the required change in resource usage for the UE based on available resources of the WAN;
    if the required change in resource usage is not possible by the WAN:
      send in response to the resource request, via the transceiver, a resource response to the gateway indicating that the required change in resource usage is not possible, in order for the gateway to respond to a bearer request that the bearer request cannot be fulfilled;
    if the required change in resource usage is possible by the WAN:
      cause the database unit to update database records for resource usage by the UE to accommodate the required change in resource usage; and
      send in response to the resource request, via the transceiver, a resource response to the gateway indicating that the required change in resource usage is possible, in order for the gateway to respond to the bearer request that the bearer request can be fulfilled.

3. An apparatus configured to operate as a gateway between a wireless access network (WAN) and a telecommunications network, wherein the WAN configures a plurality of user equipment (UEs) for operation in the WAN, the apparatus comprising:
  a first transceiver configured to communicate with a wireless access controller (WAC) of the WAN, wherein the WAC monitors resource usage of the WAN by each user equipment (UE) of the plurality of UEs and maintains a database of resource usage by each UE;
  a second transceiver configured to communicate with a node of the telecommunications network; and
  a bearer request processor configured to:
    receive, via the second transceiver, from the node of the telecommunications network, a bearer request, the bearer request being a request to create, modify, or terminate a bearer associated with a UE of the plurality of UEs;
    send in response to the bearer request, via the first transceiver, a status request to the WAC regarding the WAN;
    receive, via the first transceiver a status response from the WAC in reply to the status request, the status response indicating at least one of available resources of the WAN and current resource usage in the WAN by the plurality of UEs;
    determine, based on the status response, whether the WAN can accommodate a required change in resource usage to create, modify, or terminate the bearer associated with a UE to fulfil the bearer request; and
    send, via the second transceiver, a bearer response to the node of the telecommunications network indicating whether or not it is possible to fulfil the bearer request based on the request for the required change in the resource usage in the WAN.

4. A method in a gateway between a wireless access network (WAN) and a telecommunications network, wherein the WAN configures a plurality of user equipment (UEs) for operation in the WAN, the method comprising:
  receiving, from a node of the telecommunications network, a bearer request, the bearer request containing any one of a request to create, modify, or terminate a bearer associated with a user equipment (UE) of the plurality of UEs;
  sending, in response to the bearer request, a resource request to a wireless access controller (WAC) of the WAN, the resource request identifying the UE and indicating a required change in resource usage for the UE in order to fulfil the bearer request, wherein the WAC monitors resource usage of the WAN by each user equipment (UE) of the plurality of UEs and maintains a database of resource usage by each UE;
  receiving a resource response from the WAC, wherein the resource response is a reply to the resource request, and when the WAN is capable of accommodating the required change in the resource usage for the UE based on available resources of the WAN, the WAC updates the database of the resource usage with the required change and indicates accommodation of the required change in the resource response; and
  sending a bearer response to the node of the telecommunications network, wherein the bearer response is generated from the resource response to indicate whether or not it is possible to fulfil the bearer request based on the request for the required change.

5. The method according to claim 4, wherein the node of the telecommunications network is a Packet Data Network Gateway (PDN-GW).

6. The method according to claim 4, wherein the bearer request and the resource request further contain a request for network provided location information (NPLI) of the UE, and the bearer response and the resource response further comprise the location information.

7. The method according to claim 4, wherein the resource request identifies the UE by one or more of:
an internet protocol (IP) address of the UE;
an International Mobile Subscriber Identity (IMSI) of the UE; and
a media access control (MAC) address of the UE.

8. A method in a wireless access controller (WAC) of a wireless access network (WAN), wherein a plurality of user equipment (UEs) are connected to the WAN, the method comprising:
monitoring resource usage of the WAN by each user equipment (UE) of the plurality of UEs;
maintaining a database of resource usage by each of the UEs;
receiving a resource request from a gateway between the WAN and a telecommunications network, the resource request identifying a UE of the plurality of UEs and indicating a required change in resource usage for the UE; and
determining whether the WAN is capable of accommodating the required change in resource usage for the UE based on available resources of the WAN;
if the required change in resource usage is not possible by the WAN:
sending, in response to the resource request, a resource response to the gateway indicating that the required change in resource usage is not possible, in order for the gateway to respond to a bearer request that the bearer request cannot be fulfilled;
if the required change in resource usage is possible by the WAN:
updating database records for resource usage by the UE to accommodate the required change in resource usage; and
sending, in response to the resource request, a resource response to the gateway indicating that the required change in resource usage is possible, in order for the gateway to respond to the bearer request that the bearer request can be fulfilled.

9. The method according to claim 8, wherein:
the database further contains network provided location information (NPLI) for each of the UEs;
the resource request contains a request for NPLI for the UE; and
the resource response contains the NPLI for the UE.

10. A method in a gateway between a wireless access network (WAN) and a telecommunications network, wherein the WAN configures a plurality of user equipment (UEs) for operation in the WAN, the method comprising:
receiving, from a node of the telecommunications network, a bearer request, the bearer request containing any one of a request to create, modify, or terminate a bearer associated with a user equipment (UE) of the plurality of UEs;
sending, in response to the bearer request, a status request to a wireless access controller (WAC) of the WAN, wherein the WAC monitors resource usage of the WAN by each user equipment (UE) of the plurality of UEs and maintains a database of resource usage by each UE;
receiving a status response from the WAC in reply to the status request, the status response indicating at least one of available resources of the WAN and current resource usage in the WAN by the plurality of UEs;
determining, based on the status response, whether the WAN can accommodate a required change in resource usage to create, modify, or terminate the bearer associated with a UE to fulfil the bearer request; and
sending a bearer response to the node of the telecommunications network indicating whether or not it is possible to fulfil the bearer request based on the request for the required change in the resource usage in the WAN.

11. The method according to claim 10, wherein the gateway is any one of:
a Trusted Wireless Access Gateway (TWAG);
a Trusted Wireless AAA Proxy (TWAP); and
an Evolved Packet Data gateway (ePDG).

12. A non-transitory computer readable storage medium containing computer readable code which, when run on an apparatus of a gateway between a wireless access network (WAN) and a telecommunications network, where the WAN configures a plurality of user equipment (UEs) for operation in the WAN, causes the gateway to perform operations comprising:
receiving, from a node of the telecommunications network, a bearer request, the bearer request containing any one of a request to create, modify, or terminate a bearer associated with a user equipment (UE) of the plurality of UEs;
sending, in response to the bearer request, a resource request to a wireless access controller (WAC) of the WAN, the resource request identifying the UE and indicating a required change in resource usage for the UE in order to fulfil the bearer request, wherein the WAC monitors resource usage of the WAN by each user equipment (UE) of the plurality of UEs and maintains a database of resource usage by each UE;
receiving a resource response from the WAC wherein the resource response is a reply to the resource request, and when the WAN is capable of accommodating the required change in the resource usage for the UE based on available resources of the WAN, the WAC updates the database of the resource usage with the required change and indicates accommodation of the required change in the resource response; and
sending a bearer response to the node of the telecommunications network, wherein the bearer response is generated from the resource response to indicate whether or not it is possible to fulfil the bearer request based on the request for the required change.

13. The non-transitory computer readable storage medium according to claim 12, wherein the computer readable code, when run on the apparatus, causes the gateway to communicate with a node of the telecommunications network that is a Packet Data Network Gateway (PDN-GW).

14. The non-transitory computer readable storage medium according to claim 12, wherein the computer readable code, when run on the apparatus, causes the gateway to perform operations where the bearer request and the resource request further contain a request for network provided location information (NPLI) of the UE, and the bearer response and the resource response further comprise the location information.

15. The non-transitory computer readable storage medium according to claim 12, wherein the computer readable code, when run on the apparatus, causes the gateway to perform operations where the resource request identifies the UE by one or more of:

an internet protocol (IP) address of the UE;

an International Mobile Subscriber Identity (IMSI) of the UE;

a media access control (MAC) address of the UE.

16. A non-transitory computer readable storage medium containing computer readable code which, when run on an apparatus of a wireless access controller (WAC) of a wireless access network (WAN), where a plurality of user equipment (UEs) are connected to the WAN, causes the WAC to perform operations comprising:

monitoring resource usage of the WAN by each user equipment (UE) of the plurality of UEs;

maintaining a database of resource usage by each of the UEs;

receiving a resource request from a gateway between the WAN and a telecommunications network, the resource request identifying a UE of the plurality of UEs and indicating a required change in resource usage for the UE; and determining whether the WAN is capable of accommodating the required change in resource usage for the UE based on available resources of the WAN;

if the required change in resource usage is not possible by the WAN:

sending, in response to the resource request, a resource response to the gateway indicating that the required change in resource usage is not possible, in order for the gateway to respond to a bearer request that the bearer request cannot be fulfilled;

if the required change in resource usage is possible by the WAN:

updating database records for resource usage by the UE to accommodate the required change in resource usage; and sending, in response to the resource request, a resource response to the gateway indicating that the required change in resource usage is possible, in order for the gateway to respond to the bearer request that the bearer request can be fulfilled.

17. The non-transitory computer readable storage medium according to claim 16, wherein the computer readable code, when run on the apparatus, causes the WAC to perform operations where:

the database further contains network provided location information (NPLI) for each of the UEs;

the resource request contains a request for NPLI for the UE; and the resource response contains the NPLI for the UE.

18. A non-transitory computer readable storage medium containing computer readable code which, when run on an apparatus of a gateway between a wireless access network (WAN) and a telecommunications network, where the WAN configures a plurality of user equipment (UEs) for operation in the WAN, causes the gateway to perform operations comprising:

receiving, from a node of the telecommunications network, a bearer request, the bearer request containing any one of a request to create, modify, or terminate a bearer associated with a user equipment (UE) of the plurality of UEs;

sending, in response to the bearer request, a status request to a wireless access controller (WAC) of the WAN, wherein the WAC monitors resource usage of the WAN by each user equipment (UE) of the plurality of UEs and maintains a database of resource usage by each UE;

receiving a status response from the WAC in reply to the status request, the status response indicating at least one of available resources of the WAN and current resource usage in the WAN by the plurality of UEs;

determining, based on the status response, whether the WAN can accommodate a required change in resource usage to create, modify, or terminate the bearer associated with a UE to fulfil the bearer request; and sending a bearer response to the node of the telecommunications network indicating whether or not it is possible to fulfil the bearer request based on the request for the required change in the resource usage in the WAN.

* * * * *